Figure 1:
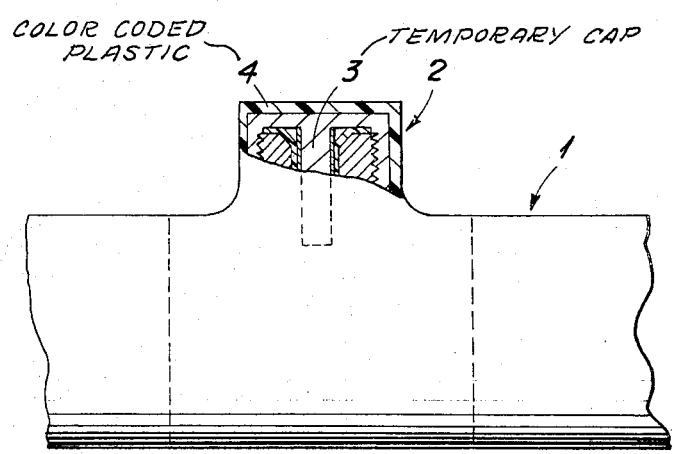

United States Patent [19]
Higgins

[11] 3,778,531
[45] Dec. 11, 1973

[54] DISTRIBUTION CABLE WITH COAXIAL CONNECTORS PERMANENTLY CONNECTED THERETO AND A METHOD OF MANUFACTURE THEREOF

[75] Inventor: Peter Higgins, Hounslow, England

[73] Assignee: British Insulated Callender's Cables Limited, London, England

[22] Filed: Oct. 2, 1972

[21] Appl. No.: 294,082

[52] U.S. Cl. ............... 174/72 R, 29/628, 174/71 C, 174/112
[51] Int. Cl. ..................... H01r 3/02, H01r 43/00
[58] Field of Search .............. 174/71 R, 71 C, 72 R, 174/88 R, 88 C, 112; 29/628; 156/49; 307/147

[56] References Cited
UNITED STATES PATENTS

| | | | |
|---|---|---|---|
| 2,459,004 | 1/1949 | Rogoff | 174/71 R |
| 2,694,183 | 11/1954 | Edlen et al. | 174/71 C UX |
| 3,461,419 | 8/1969 | Link | 174/71 C X |
| 3,626,082 | 12/1971 | Kasai et al. | 174/72 R |

FOREIGN PATENTS OR APPLICATIONS

| | | | |
|---|---|---|---|
| 647,512 | 8/1962 | Canada | 174/71 R |
| 1,140,618 | 12/1962 | Germany | 174/72 R |
| 727,111 | 3/1955 | Great Britain | 174/71 R |

*Primary Examiner*—Laramie E. Askin
*Attorney*—Eugene F. Buell

[57] ABSTRACT

In an electrical distribution cable comprising a number of insulated electric power conductors and a neutral conductor, the assembly of conductors being enclosed in a protective insulating sheath, a coaxial connector is permanently secured to the cable at each of a plurality of spaced locations along its length before it is installed. The inner conductive element of each connector is electrically connected to one of the power conductors of the cable and the outer conductive element of the connector is electrically connected to the neutral conductor of the cable. Each of the coaxial connectors is at least partially embedded in a protective insulating covering integral with or bonded to the protective sheath of the cable. The neutral conductor may be laid up helically with or parallel to the power conductors or it may be in the form of an outer concentric conductor.

18 Claims, 6 Drawing Figures

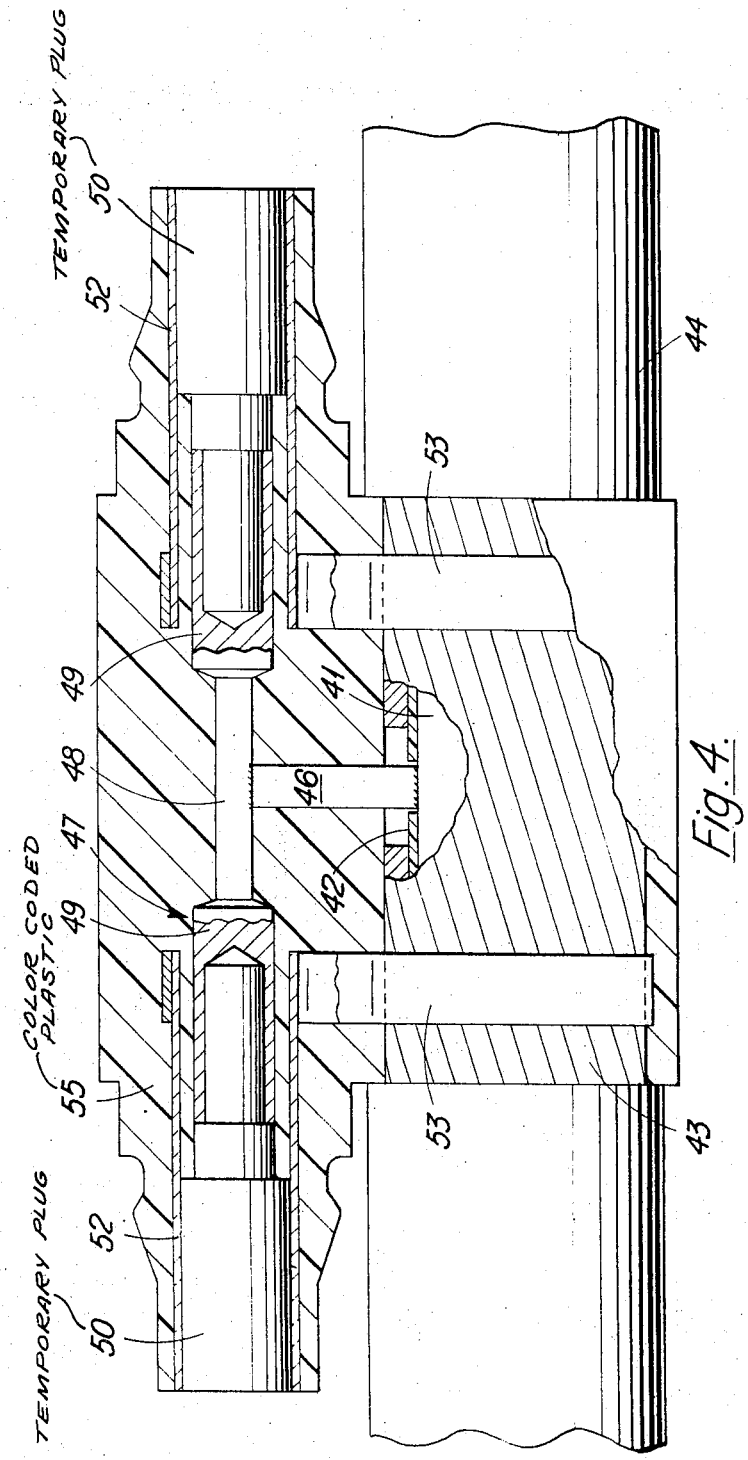

DISTRIBUTION CABLE WITH COAXIAL CONNECTORS PERMANENTLY CONNECTED THERETO AND A METHOD OF MANUFACTURE THEREOF

This invention relates to electric power distribution cables comprising a number of insulated electric power conductors and a neutral conductor, the assembly of conductors being enclosed in a protective insulating sheath. The neutral conductor may be helically laid up with the insulated power conductors, or may be arranged with the insulated power conductors to lie with their axes in a common plane, to form an assembly of conductors, which may or may not be surrounded by an outer conductive layer in electrical contact with the neutral conductor; or the neutral conductor may be constituted by an outer conductor surrounding the insulated power conductors, usually known as and hereinafter referred to as an "outer concentric conductor", which acts as a neutral or return conductor and also provides some degree of mechanical and/or electrical protection for the insulated power conductors. All such cables are used for local distribution of power to consumers, for example in houses or factories, through single or multi-phase branch cables referred to as consumer service cables, which during their installation are connected to the distribution cable at service joint boxes.

A large proportion of the cost of installing consumer service cables results from the time taken in effecting a joint between a service cable and the distribution cable and because such jointing must be carried out by skilled personnel. Objects of the present invention are to provide an improved distribution cable to which service cables can be quickly connected in a simple and efficient manner without the need for service joint boxes to be used and which therefore substantially reduces the cost of providing for local distribution of power to consumers, and to provide a method of making such cable.

In the distribution cable in accordance with the invention a coaxial connector is permanently secured to the cable at each of a plurality of spaced locations along its length before it is installed, the inner conductive element of each of said connectors being electrically connected to one of the power conductors of the cable and the outer conductive element of said connector being electrically connected to the neutral conductor of the cable, and each of the coaxial connectors is at least partially embedded in a protective insulating covering integral with or bonded to the protective sheath of the cable.

Preferably each coaxial connector is temporarily wholly embedded in the protective insulating covering. Preferably also means is associated with each of the embedded connectors for indicating its location.

The indicating means associated with each embedded connector may be constituted solely by local deformation of the sheath in the region of the embedded connector but it is preferably additionally or alternatively constituted by means which identifies that one of the insulated power conductors of the cable to which the associated embedded connector is connected. Such identification means may comprise insignia embossed in the sheath but they preferably comprise markings on the sheath or the use of a protective insulating covering of a colour appropriate to the phase of the insulated power conductor to which an embedded connector is connected.

The outer conductive element of each connector is preferably integral with or connected to a saddle or strap which, in the case where the neutral conductor is laid up helically with or parallel to the insulated power conductors, extends over the neutral conductor and around a substantial portion of the periphery of the assembly of conductors and is welded or otherwise permanently secured to the neutral conductor and/or to the overlying conductive layer, when present, and which, in the case where the neutral conductor is an outer concentric conductor, extends around and is welded or otherwise permanently secured to the outer concentric conductor over at least a substantial proportion of its periphery. The inner conductive element of each connector, or an extension integral or connected therewith, preferably extends radially inwardly through a hole previously formed through the outer conductive layer or the outer concentric conductor, when present, and in the insulation of the underlying power conductor and is welded or otherwise electrically connected to the power conductor, the inner conductive element, or the extension thereof, being electrically insulated from the outer conductive layer or the outer concentric conductor, when present, and from the outer conductive element, for instance by an insulating sleeve. Preferably at its outer end the inner conductive element constitutes a socket and the outer conductive element may be screw threaded. When the connector is to be wholly embedded in the covering of insulating material, the connector is preferably temporarily closed by a plug or cap which prevents the material of the covering filling the socket and/or threads of the connector.

The invention also includes a method of making a distribution cable in accordance with the present invention, which method comprises drilling or otherwise forming a hole at each of a plurality of spaced locations along the cable length through the outer conductive layer or the outer concentric conductor, where necessary, and through the insulation of the underlying power conductor to expose the conductor; inserting the inner conductive element of said connector, or an extension integral with or connected to the inner element, in the hole and electrically connecting it to the exposed power conductor; electrically connecting the outer conductive element of said connector, or an extension integral with or connected to the outer element, to the neutral conductor of the cable; and at least partialy embedding each of said connectors in a covering of insulating platic material in such a way that the covering is integral with or bonded to the protective sheath of the cable.

Each connector may be partially embedded in the plastic covering to the extent that its inner and outer conductive elements are exposed for effecting connection to a service cable but preferably each connector is temporarily wholly embedded in the plastic covering.

In a preferred method of permanently securing a coaxial connector at a location along the length of the distribution cable a tubular boss, which constitutes or which is integral with or adapted to be connected to the outer conductive element of the connector, is positioned above an insulated power conductor of the cable with its axis substantially normal to the axis of the cable and is welded or otherwise permanently secured to the neutral conductor of the cable, the tubular boss being of sufficient length to serve as a jig for a drill for drilling a hole beneath the tubular boss through the outer conductive layer or the outer concentric conductor, when necessary, and through the insulation of the underlying power conductor.

Where it is required to provide provision for connection of a single service cable at a location along the length of the distribution cable, the part of the inner conductive element of the connector, or the extension thereof, to which the service cable conductor is to be connected, is arranged to extend in a direction normal to the axis of the cable.

Where it is required to provide provision for connection of two service cables to the same power conductor of the distribution cable at a location along the length of the distribution cable, a metal elongate member is electrically connected to the power conductor and is arranged to extend in a direction substantially normal to the axis of the cable and this member is integral with or connected to the inner conductive elements of a pair of coaxial connectors spaced longitudinally along and extending substantially parallel to the cable. In this case electrical connection between the outer conductive element of each connector of the pair and the neutral conductor of the cable is preferably effected by means of a saddle or strap which is caused to embrace the outer conductive element and which, in the case where the neutral conductor is laid up helically with or substantially parallel to the insulated power conductors, is applied over the neutral conductor and around a substantial portion of the periphery of the assembly of conductors and which, in the case where the neutral conductor is an outer concentric conductor, is applied around the outer concentric conductor over at least a substantial proportion of its periphery.

The connectors may be permanently secured to the cable before the outer protective sheath of insulating material is applied, in which case the connectors will be wholly embedded in the plastic material of the sheath when the sheath is extruded on to the assembly of conductors, or the connectors may each be permanently secured to the cable after the cable has been sheathed by removing part of the sheath at each location where a connector is to be secured to expose sufficient of the neutral conductor to facilitate welding or otherwise securing the outer conductive element, or an extension thereof, to it and, after securing of the connector is completed, the cable sheath is re-formed about the connector, for example by pouring or injecting plastic material into a mould fitted around the connector or by wrapping plastic tape about the connector and adjacent parts of the sheath and heating the tape to melt the tape and form a plastic mass in which the connector is at least partially embedded and which will bond to the adjacent parts of the sheath on cooling.

The connectors are preferably secured to the cable in the factory during manufacture of the cable or in a workshop before the cable is installed and consequently electrical connection of the inner conductive element or an extension thereof, of each connector to a power conductor can be and preferably is effected by the friction welding technique, the element being rotated at high speed about its axis and urged into contact with the exposed part of the power conductor. Alternative methods of electrically connecting the inner conductive element to a power conductor that may be employed include tapping a hole in the conductor and screwing the element therein and soldering the element to the exposed part of the power conductor.

As previously stated, the tubular boss constituting or adapted to be electrically connected to the outer conductive element of the connector is preferably integral with or connected to a saddle or strap which is adapted to extend around a substantial proportion of the assembly of conductors or of the outer concentric conductor, preferably around at least half of the length of the periphery thereof.

The invention further includes a method of jointing a service cable to a distribution cable according to the invention, which method includes the steps of cutting back an end of the service cable to expose the power and outer concentric conductors; where necessary removing the insulating material in which the connector to which the service cable is to be jointed is embedded to a sufficient extent to expose the inner and outer conductive elements of the connector; electrically connecting to the respective conductive elements of said connector the exposed power and outer concentric conductors of the service cable; and enclosing the connection between the distribution and service cables in a body of plastic insulating material that bonds to or fits closely on the adjacent parts of the sheaths of the cables.

The exposed power and outer concentric conductors of the service cable may have a complementary coaxial connector connected to them, or the inner conductive element of the connector secured to the distribution cable may constitute a socket and the prepared end of the service cable itself at least in part, be employed as a complementary coaxial connector by using the exposed end of the power conductor as a pin and by electrically and mechanically connecting the outer concentric conductor of the service cable to the outer conductive element of the connector secured to the distribution cable by appropriate metal gland nuts.

The body of insulating material preferably comprises a sleeve of heat shrinkable plastic material but bodies of other forms may be used; for instance, the body may comprise a helically lapped layer of self-amalgamating plastic tape. Disconnection of a connection between distribution and service cables is facilitated because it can be effected by simply removing the outer body of plastic insulating material to expose the connection and disengaging the service cable from the connector on the distribution cable.

Figure 3:
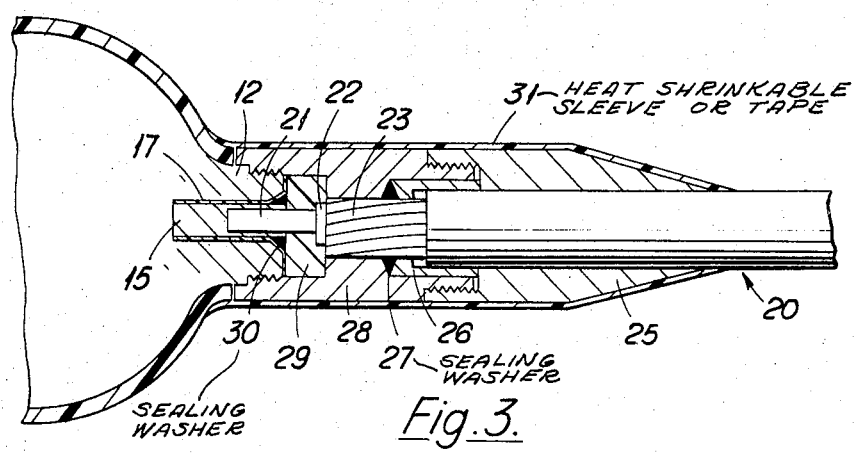
Figure 2A:
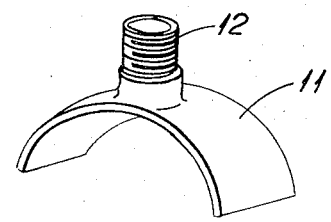
Figure 2B:
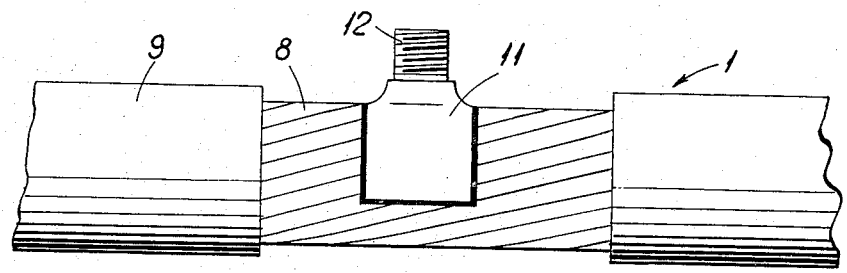
Figure 2C:
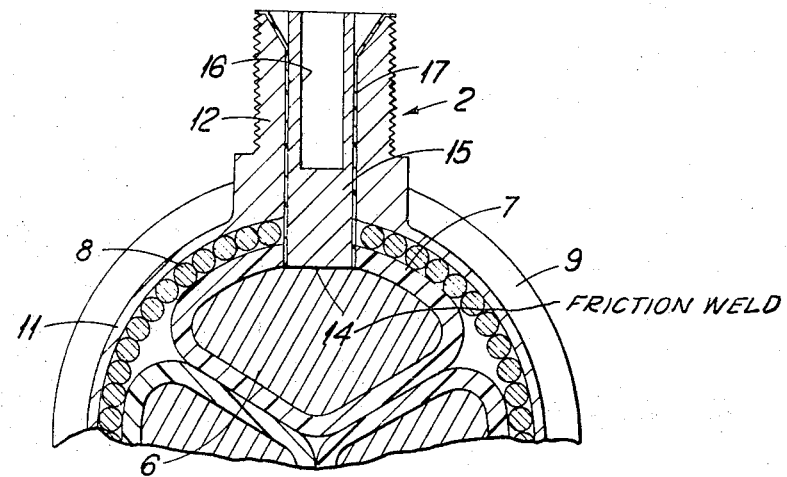

The invention will be further described, by way of example, with reference to the accompanying drawings, in which FIG. 1 is a side view partly in section and partly in elevation of part of a distribution cable having a coaxial connector permanently secured to it at each of a plurality of spaced locations along its length;

FIG. 2(a) to (c) illustrates the steps in securing the coaxial connector shown in FIG. 1 to the distribution cable;

FIG. 3 is a sectional side elevation of a service cable connection to the distribution cable shown in FIG. 1, and FIG. 4 is a side view partly in section and partly in elevation of part of a distribution cable having two coaxial connectors permanently secured to it at each of a plurality of spaced locations along its length.

Referring to FIG. 1 a distribution cable 1 has permanently connected to it at each of a plurality of spaced locations along its length, of which only one is shown, a coaxial connector 2 for connecting a single cable to the distribution cable. The coaxial connector 2 is temporarily closed by a cap 3 screwed to the connector and the temporarily closed connector is wholly embedded in a molded body 4 of plastic insulating material that is bonded to the sheath of the distribution cable 1 and that carries a marking of a colour appropriate to the phase conductor to which the connector is connected.

As will be seen on referring to FIG. 2 (*a*) to (*c*) in the method of permanently securing a coaxial connector 2 to a distribution cable 1 having an outer concentric conductor 8, a part of the cable sheath 9 is removed at each of a plurality of spaced locations along the length of the cable to expose the outer concentric conductor (FIG. 2(*b*)) and a saddle 11 carrying an integral externally screw threaded tubular boss 12 (FIG. 2(*a*)) constituting the outer concentric element of the connector is welded to the exposed outer concentric conductor, for instance by the tungsten-inert-gas welding technique, with the boss overlying the power conductor to which connection is to be made. A hole is drilled through the outer concentric conductor 8 and through the dielectric 7 of the underlying power conductor 6 using the boss 12 as a jig and employing a flat-ended drill to provide an exposed flat surface 14 on the power conductor. An inner conductive element 15 of the connector, having a socket part 16 at one end, is introduced into the hole and is friction welded to the exposed surface 14 of the power conductor and a preformed sleeve 17 of insulating material is fitted between the inner element 15 and the boss 12, the free end of the bore of the boss being flared and the sleeve 17 being appropriately shaped at its free end. Where necessary the inner conductive element 15 may be of bi-metallic construction, the radially inner end of the element being of aluminium or an aluminium alloy and the socket part 16 of the element being of copper. As previously indicated in FIG. 1 the connector is temporarily closed by a cap and embedded in a molded body of plastic insulating material bonded to the sheath 9.

In effecting the service cable connection shown in FIG. 3 the moulded body in which the connector is embedded is removed and the temporary cap withdrawn to expose the inner and outer conductive elements of the connector. An end of the single core service cable 20 that is to be connected to the distribution cable is cut back to expose the core conductor 21, the dielectric 22 and the outer concentric conductor 23 and a metal gland nut 25, a metal sleeve 26, a sealing washer 27, a metal gland nut 28 and an insulating bush 29 which seats in the stepped bore of the gland nut 28, are slipped over the prepared end of the service cable. A sealing washer 30 is fitted in the flared end of the tubular boss 12 between the inner conductive element 15 and the flared end of the insulating sleeve 17 and the bared end of the service cable conductor 21 is introduced into the socket part of the inner conductive element until the insulating bush 29 abuts the end face of the connector. The gland nut 28 is now screwed tightly on to the externally screw threaded tubular boss 12 and the gland nut 25 then screwed on to the gland nut 28 to cause the sleeve 26 to urge the sealing washer 21 against a shoulder on the gland nut 28 and effect a seal with the outer concentric conductor 23. The service connector so formed is insulated overall by a sleeve 31 of shrinkable plastic material or by self-amalgamating plastic tape.

The distribution cable shown in FIG. 4 comprises three solid aluminium sector shaped power conductors 41 each insulated by a dielectric wall 42 and helically laid up together, an outer concentric conductor 43 formed by a plurality of aluminum wires laid helically about the cable cores, and an outer plastic sheath 44. At the location where service connectors for two service cables are to be secured, a short length of the sheath 44 is removed to expose the outer concentric conductor 43 and a hole is drilled through the outer concentric conductor and through the dielectric 42 of the power conductor 41 to which connection is to be made to expose the surface of the conductor. As in the method described with reference to FIG. 2, preferably a flat-ended drill is employed to provide a flat surface on the conductor. An aluminium stud 46 is friction welded to the exposed surface of the conductor 41 in such a way that the stud protrudes normally to the axis of the socket cable and the central limb 48 of a double-ended bi-metallic phase socket 47 is welded to the said end of the stud 46 in such a way that the limb extends substantially parallel to the cable. The double-ended phase socket 47 comprises the central limb 48 of aluminium and, secured to each end of the limb, phase sockets 49 of copper. A temporary plug 50 is then fitted into each socket 49, each plug being stepped at two spaced locations along its length in such a way that the smaller end of the plug fits in the socket, a central portion of the plug has a diameter approximating the external diameter of the socket, and the larger end of the plug has a diameter appropriate to provide a seating for a neutral socket 52 of bi-metallic construction, one end of the socket being of copper and the other end of aluminium or an aluminium alloy. Each neutral socket 52 is electrically connected to the outer concentric conductor 43 of the distribution cable by applying a metal strip 53 about the aluminum end of the socket and about the outer concentric conductor and welding it to the socket and conductor. The assembly is now placed in a mould and a body 55 of plastic insulating material is moulded about the double ended connector so formed, the plastic material filling the annular space between each phase socket 49 and the surrounding neutral socket 52 and bonding to the plastic sheath 44. The ends of the moulded body 55 surrounding the connectors may each be appropriately shaped so that a protruding insulating sleeve of a co-operating plug connected to an end of a service cable will make a snap fit on the end of the moulded body. The plastic material of the moulded body is preferably of a colour appropriate to the phase of the power conductor to which connection is made.

The distribution cable in accordance with the invention has several important advantages not provided by distribution cables at present in use. The connectors carried by the cable at spaced locations along its length can be welded or otherwise secured to the neutral conductor and to a power conductor of the power cable without opening up the cable and without even disturbing the outer concentric conductor, when present, and the welded connections can be effected in the factory during manufacture of the cable or in a workshop before the cable is installed. The end of a service cable for connection to a connector can be quickly and simply prepared on site as required and the service cable can

What I claim as my invention is:

1. A distribution cable comprising a number of insulated electric power conductors and a neutral conductor, the assembly of conductors being enclosed in a protective insulating sheath, wherein a coaxial connector comprising inner and outer conductive elements is permanently secured to the cable at each of a plurality of spaced locations along its length before it is installed, the inner conductive element of each of said connectors being electrically connected to one of the power conductors of the cable and the outer conductive element of said connector being electrically connected to the neutral conductor of the cable, and each of the coaxial connectors is at least partially embedded in a protective insulating covering.

2. A distribution cable comprising a number of insulated electric power conductors and a neutral conductor, the assembly of conductors being enclosed in a protective insulating sheath, wherein a pair of coaxial connectors each comprising inner and outer conductive elements is permanently secured to the cable at each of a plurality of spaced locations along its length before it is installed, the inner conductive element of each connector of each pair being electrically connected to the same power conductor of the cable and the outer conductive element of each said connector being electrically connected to the neutral conductor of the cable, and each of said connectors is at least partially embedded in a protective insulating covering.

3. A distribution cable as claimed in claim 1, wherein the protective insulating covering of each coaxial connector is integral with the protective sheath of the cable.

4. A distribution cable as claimed in claim 1, wherein each coaxial connector is temporarily wholly embedded in the protective insulating covering.

5. A distribution cable as claimed in claim 4, wherein means is associated with each of the embedded connectors for indicating its location.

6. A distribution cable as claimed in claim 5, wherein each connector location indicating means identifies that one of the insulated power conductors to which the associated embedded connector is connected.

7. A distribution cable as claimed in claim 6, wherein the protective insulating covering of each embedded connector is at least partially of a colour appropriate to the phase of the insulated power conductor to which the associated embedded connector is connected.

8. A distribution cable as claimed in claim 1, in which the neutral conductor is laid up with the insulated power conductors, wherein the outer conductive element of each connector is electrically connected to a metal member which extends over the neutral conductor and around a substantial portion of the periphery of the assembly of conductors and is permanently secured to the neutral conductor.

9. A distribution cable as claimed in claim 1, in which the neutral conductor is an outer concentric conductor, wherein the outer conductive element of each connector is electrically connected to a metal member which extends around and is permanently secured to the outer concentric conductor over at least a substantial proportion of its periphery.

10. A distribution cable as claimed in claim 1, wherein the inner conductive element of each connector extends radially inwardly through a hole previously formed through the insulation of the underlying power conductor and is electrically connected to the power conductor, the inner conductive element being electrically insulated from the outer conductive element.

11. A distribution cable as claimed in claim 10, in which the insulated power conductors are surrounded by an outer concentric conductor, wherein the inner conductive element of each connector extends radially inwardly through a hole previously formed through, and is electrically insulated from, the outer concentric conductor.

12. A distribution cable as claimed in claim 1, wherein at its outer end the inner conductive element constitutes a socket.

13. A distribution cable as claimed in claim 12, wherein each connector is temporarily closed by a detachable sealing device.

14. A distribution cable as claimed in claim 1, wherein the outer conductive element of each connector is screw threaded.

15. A distribution cable as claimed in claim 1, wherein at least one of the inner and outer conductive elements of at least one of the connectors is of bimetallic construction, one end of the element being of copper and the other end being of a metallic material selected from aluminium and aluminium alloys.

16. A method of making a distribution cable comprising a number of insulated power conductors and a neutral conductor, the assembly of conductors being enclosed in a protective insulating sheath, and a plurality of coaxial connectors each permanently secured to the cable at one of a plurality of spaced locations along the cable length, which method comprises forming a hole at each of said locations through the insulation of the underlying power conductor to expose the conductor; inserting the inner conductive element of said connector in the hole and electrically connecting it to the exposed power conductor; electrically connecting the outer conductive element of said connector to the neutral conductor of the cable; and at least partially embedding each of said connectors in a covering of insulating plastic material.

17. A method of making a distribution cable comprising a number of insulated power conductors and a neutral conductor, the assembly of conductors being enclosed in a protective insulating sheath, and a plurality of coaxial connectors each permanently secured to the cable at one of a plurality of spaced locations along the cable length, which method comprises positioning above an insulated power conductor of the cable at each of said locations a tubular boss, which constitutes at least a part of the outer conductive element of a connector, with its axis substantially normal to the axis of the cable, and permanently securing the tubular boss to the neutral conductor of the cable; using the tubular boss as a jig for a drill and drilling a hole through the insulation of the underlying power conductor to expose the conductor; inserting the inner conductive element of said connector in the hole and electrically connecting it to the exposed power conductor; and at least partially embedding each of said connectors in a covering of insulating plastic material.

18. A method of jointing a service cable comprising at least one insulated power conductor and an outer concentric neutral conductor to a distribution cable comprising a number of insulated power conductors and a neutral conductor and having a plurality of coaxial connectors each permanently secured to a power conductor and the neutral conductor of the distribution cable at one of a plurality of spaced locations along the cable length and at least partially embedded in a protective insulating covering, which method includes the steps of cutting back an end of the service cable to expose the power and outer concentric conductors, removing the insulating material in which the connector to which the service cable is to be jointed is embedded to a sufficient extent to expose the inner and outer conductive elements of the connector; electrically connecting to the respective conductive elements of said connector the exposed power and outer concentric conductors of the service cable; and enclosing the connection between the distribution and service cables in a body of plastic insulating material.

* * * * *